Feb. 9, 1960
R. E. LOFTS
2,924,031
HYDRAULICALLY OPERATED FARM GATE
Filed May 20, 1957
3 Sheets-Sheet 1
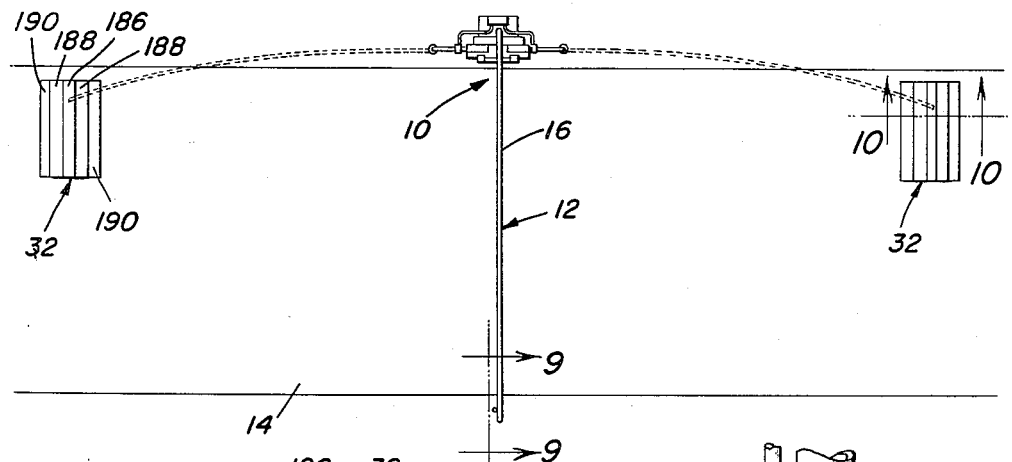
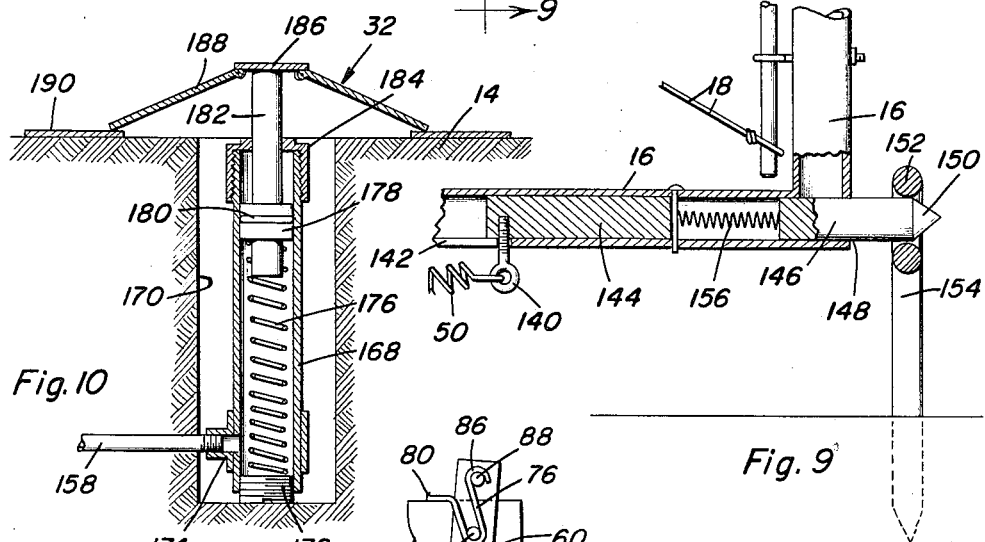
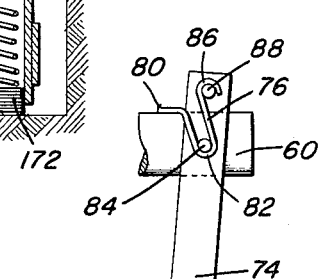
Ralph E. Lofts
INVENTOR.

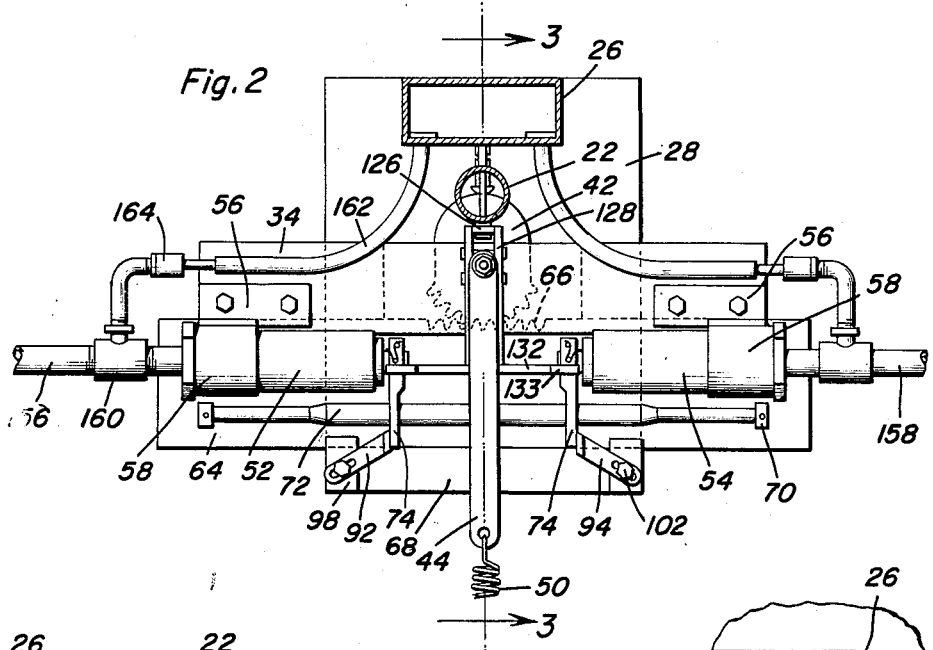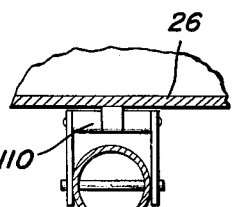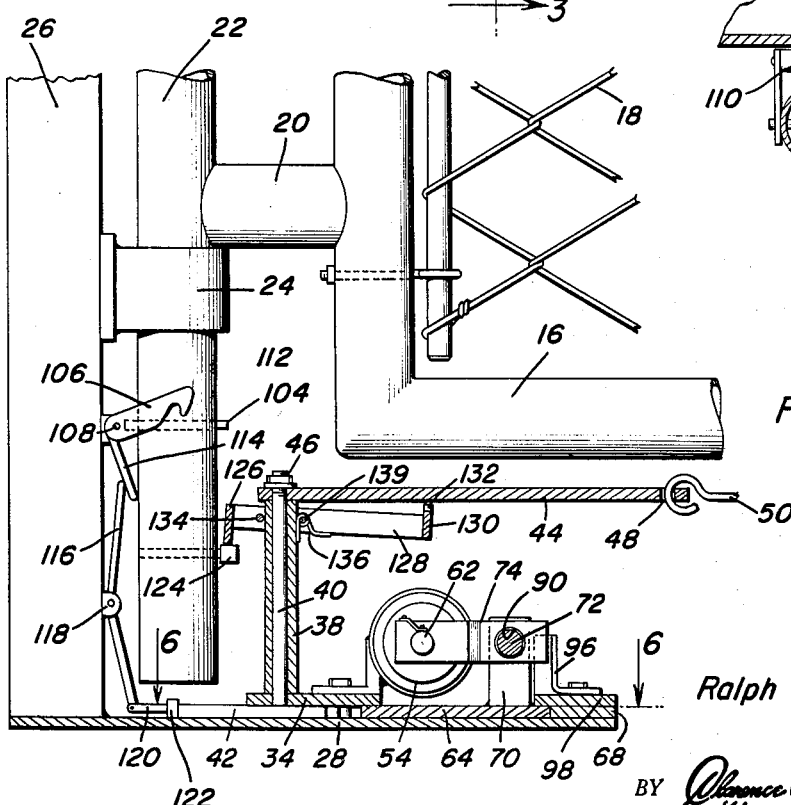

Feb. 9, 1960    R. E. LOFTS    2,924,031
HYDRAULICALLY OPERATED FARM GATE
Filed May 20, 1957    3 Sheets-Sheet 3
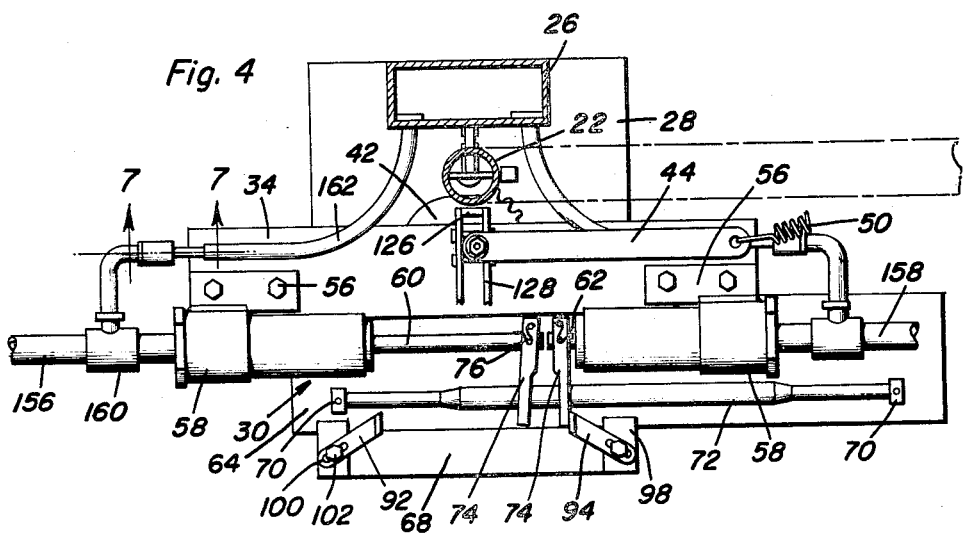
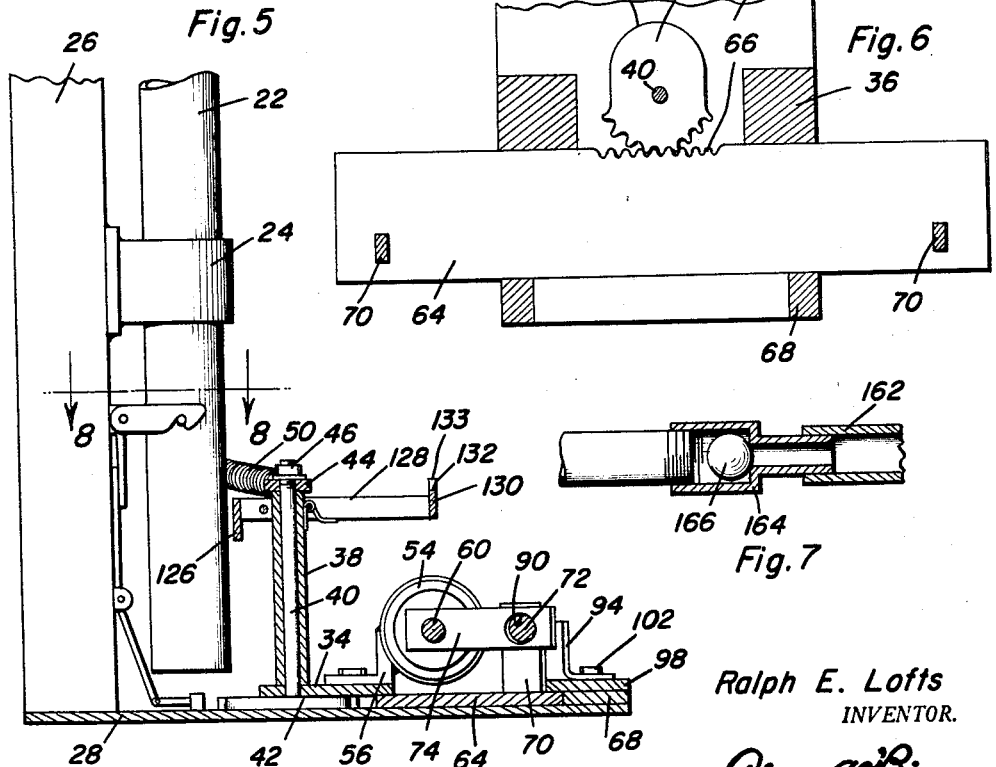
Ralph E. Lofts
INVENTOR.

United States Patent Office 2,924,031
Patented Feb. 9, 1960

2,924,031

HYDRAULICALLY OPERATED FARM GATE

Ralph E. Lofts, Jane, Mo.

Application May 20, 1957, Serial No. 660,343

3 Claims. (Cl. 39—8)

The present invention generally relates to a farm gate construction and more particularly to an automatically operated farm gate whereby a vehicle approaching the gate will cause the gate to automatically open and the gate will be retained open until the vehicle has passed after which the gate will automatically close.

An object of the present invention is to provide an automatic farm gate which is hydraulically operated and incorporates a pressure plate on either side of the gate for engagement by the vehicle for operating the gate.

Another object of the present invention is to provide a hydraulically operated farm gate in which a latch mechanism is provided for holding the farm gate in closed position with the latch mechanism being released by the hydraulically operated mechanism immediately prior to swinging movement of the gate.

Other objects of the present invention will reside in its simplicity of construction, adaptation for its particular purposes, efficiency of operation and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic plan view of the hydraulically operated farm gate of the present invention;

Figure 2 is a detailed plan view of the gate operating mechanism with the gate and the supporting post being in section and with the gate being disposed in closed position;

Figure 3 is a transverse sectional view taken substantially upon a plane passing along section line 3—3 of Figure 2 illustrating the structural arrangement of the gate operating mechanism;

Figure 4 is a plan view similar to Figure 2 but with the gate operating mechanism moved to gate opening position;

Figure 5 is a sectional view similar to Figure 3 but with the gate in opened position;

Figure 6 is a plan sectional view taken substantially upon a plane passing along section line 6—6 of Figure 3 showing further structural details of the gate operating mechanism;

Figure 7 is a detailed sectional view taken substantially upon a plane passing along section line 7—7 of Figure 4;

Figure 8 is a detailed sectional view taken substantially upon a plane passing along section line 8—8 of Figure 5 illustrating a latch mechanism for holding the gate in open position;

Figure 9 is a detailed sectional view, on an enlarged scale, taken substantially upon a plane passing along section line 9—9 of Figure 1 illustrating the details of the latch mechanism for holding the gate in closed position;

Figure 10 is a detailed sectional view, on an enlarged scale, taken substantially upon a plane passing along section line 10—10 of Figure 1 illustrating the details of construction of the pressure plate and fluid pump associated therewith; and Figure 11 is a detailed sectional view of one of the clutch mechanisms operated by the gate operating piston and cylinder arrangement.

Referring now specifically to the drawings, the numeral 10 generally designates the hydraulically operated farm gate of the present invention for use in automatically opening and closing a gate 12 so that the gate 12 may be disposed in closed relation to a roadway or path or any other passageway designated by the numeral 14. The gate 12 may be of any conventional construction and for the purposes of illustration, the gate 12 includes a peripheral tubular frame 16 with woven wire 18 secured thereto for forming a closure for the area defined by the frame 16. The vertical portion of the frame 16 is provided with a pair of tubular projections 20 which terminate in a tubular vertical support member 22 journaled in support bearings 24 mounted on an upright rigid post 26. It is noted that the bearings 24 may be in the form of straps or the like which engage the under-edge of the tubular projections 20 thus supporting the gate 12 in a manner for swinging movement about the vertical axis defined by the vertical tubular support member 22.

The vertical post 26 may be supported from an inwardly extending base plate 28 which may be anchored to the ground by any suitable means. A gate operating mechanism generally designated by numeral 30 is supported on the base plate 28 and disposed remotely from the gate 12 is a pair of pressure plate assemblies generally designated by the numeral 32 with the pressure plate assemblies being disposed on opposite sides of the gate 12 whereby a vehicle approaching the gate 12 will engage one of the pressure plate assemblies for causing the gate to open in a manner described hereinafter.

The base plate 28 is provided with an elongated supporting and retaining plate 34 supported thereon in spaced relation by spacer blocks 36. Rigid with the elongated plate 34 is a vertically upstanding tubular sleeve or post 38 rotatably journalling a rod 40 therein. The lower end of the rod 40 extends through the plate 34 and has a segmental gear 42 rigid therewith. The upper end of the rod 40 extends above the sleeve or post 38 and has a laterally extending operating arm 44 secured thereon by a fastening or retaining nut 46. The outer end of the arm 44 is provided with an eye or aperture 48 having a tension coil spring 50 terminally secured thereto.

Also mounted on the elongated plate 34 is a pair of piston and cylinder arrangements 52 and 54 each of which are supported by brackets 56 and a mounting sleeve 58 for rigitly mounting the piston and cylinder arrangements 52 and 54 in longitudinal alignment.

Each of the piston and cylinder arrangements 52 and 54 include a piston rod with the piston rod for the piston and cylinder arrangement 52 being designated by numeral 60 while the piston rod for the piston and cylinder arrangement 54 is designated by numeral 62.

Also supported on the base 28 and retained under the plate 34 is an elongated sliding plate 64 having gear teeth 66 thereon in meshing engagement with the gear teeth on the segmental gear 42. The plate 64 is held in position by the spacer blocks 36 and also spacer blocks 68 along the outer edge thereof as shown in Figure 6. The sliding plate 64 is provided with a pair of upstanding brackets 70 thereon with the brackets supporting an elongated horizontally disposed rod 72 which is disposed in parallel spaced relation to the piston rods 60 and 62.

As specifically shown in Figure 11, the piston rod 60 is provided with a clutch element 74 pivotally mounted thereon for limited pivotal movement with a spring 76 normally canting or tilting the clutch element 74 in one direction. The spring 76 has an abutment portion 80 overlying the top of the piston rod 60 and a U-shaped portion 82 extending under a transverse pivot pin 84 and the spring 76 is provided with a terminal hook end portion 86 engaged over a projecting pin 88 thus biasing the clutching member 74 to a position in acute angular relation to the piston rod 60. The outer or free end of the clutching element 74 is provided with an aperture 90 which is slightly larger in diameter than the rod 72 with the aperture receiving the rod 72 for clutching engagement with the rod 72 when the clutching member 74 is disposed in inclined relation and for releasing the rod 72 when the rod and clutching element 74 are in perpendicular relation as when the clutching element 74 is pivoted to a perpendicular relation to the piston rod 60 against the tension of the spring 76.

For engaging the clutching member 74 and releasing the clutching member from the rod 72, a pair of stop abutments 92 and 94 are provided with the abutments being supported from brackets 96 supported on holddown plates 98 which overlie the outer edge of the sliding plate 64 thus providing the function of supporting the stop abutments 92 and 94 and completing the guide for the sliding plate 64 with the inner edge of the sliding plate 64 underlying the outer edge of the mounting and retaining plate 34 as illustrated in Figure 5. Each of the stop abutments 94 is provided with a slot 100 associated with a fastening bolt 102 for permitting adjustment of the stop abutments 92 and 94 in relation to the clutching element 74 thus varying the point of contact between the clutching elements 74 and the abutments 92 and 94 for varying the point of release of the rod 72.

The vertical tubular support member 22 is provided with a transverse and projecting pin 104 adjacent the lower bearing 24 and a pair of latch members 106 are pivotally supported from a pin 108 extending through a supporting bracket 110 supported from the vertical post 26. The latch members 106 are provided with generally hook-shaped recesses 112 adjacent the outer end thereof for engagement over the ends of the pin 104 when the gate 12 is disposed in open position as shown in Figure 5. The latch members 106 include a depending lug 114 which overlies the upper end of an elongated operating lever 116 pivotally supported at its center by a supporting bracket 118. The portions of the lever 116 on opposite sides of the bracket 118 are disposed in inclined relation to each other with the upper end of the lever 116 underlying the lug 114 on the latch 106. The lower end of the lever 116 is connected to an operating link 120 having an abutment 122 slidable upon the upper surface of the base plate 28 and disposed for engagement by the rear edge of the segmental gear 42 which is in the form of a cam surface whereby pivotal movement of the segmental gear 42 from the position shown in Figure 6 to the position shown in Figure 4 for moving the gate to an open position will permit the latches 106 to move downwardly due to the force of gravity and engage the pins 104 when the gate is in its fully open position thus latching the gate in fully open position. When the segmental gear 42 moves to a closed position, the cam surface will engage the abutment 122 thus raising the latches 106 in an obvious manner to a position shown in Figure 3 for permitting the gate 12 to move to a closed position.

The tubular support member 22 is also provided with a laterally projecting roller 124 thereon which is in rolling engagement with a transverse member 126 extending between a pair of strap members 128 which are interconnected by an elongated transverse plate member 130 at the outer end thereof with the plate member 130 having a notch 132 in the upper edge thereof for engagement with the arm 44 when the roller 124 is out of engagement with the member 126. A transverse pin 134 extends between the straps 126 on one side of the sleeve 38 for engagement therewith and limiting the pivotal movement thereof while an axial spring member 136 interconnects the sleeve 38 and the straps 128 and is mounted on pivot pin 139 for urging the elongated transverse plate 130 upwardly for receiving the arm 44.

The outer end of the spring 50 is connected with an eye bolt 140 extending through a slot 142 in the tubular frame 16 with the eye bolt being secured to a slidable plug 144. A movable pointed plug 146 is disposed in the frame 16 and projects outwardly through an opening 148 therein for having the pointed end 150 engaging in an annular member 152 at the upper end of a ground inserted anchor peg 154. The anchor peg 154 provides a latch mechanism or keeper for holding the gate 12 in closed position and a tension coil spring 156 interconnects the plug 146 and the plug 144 whereby retraction of the plug 144 will retract the plug 146 for releasing the gate from the anchor peg 154.

Extending outwardly from the outer end of each of the piston and cylinder assemblies 52 and 54 is a tubular conduit designated by numerals 156 and 158 respectively. The conduits are each provided with a T-coupling 160 having a tubular conduit 162 connected thereto and connected to the hollow post 26 with an adapter 164 being disposed in the conduit and provided with a ball check valve 166 as shown in Figure 7. The vertical post 26 may be in the form of a reservoir for the hydraulic fluid for operating the gate and assures a constant supply thereof for the pressure plates 32 which are of identical construction with the pressure plates being connected with the conduits 156 and 158 respectively.

Reference is now made to Figure 10 which illustrates the details of construction of the pressure plate 32.

The pressure plate 32 includes a vertically elongated cylinder 168 mounted in a recess 170 in the roadway 14 with the lower end of the cylinder 168 being closed by a screw threaded plug 172 and provided with a T-coupling 174 adjacent the bottom end thereof for connection with the conduit 158 or with the conduit 156. A compression coil spring 176 is disposed in the cylinder 168 and a piston 178 is slidable in the cylinder 168 and engages the upper end of the spring 176. The piston is provided with an O-ring seal 180 and a piston rod 182 extends upwardly therefrom and extends through a closure cap 184 for the cylinder 168. The upper end of the piston 182 is provided with a transversely elongated plate 186 having a pair of normally inclined ramps or plates 188 hingedly connected thereto and extending outwardly and downwardly therefrom in inclined relation. The plate 186 is normally disposed above the roadway surface 14 so that when a vehicle engages the ramps 188 and the plate 186, the piston 178 will be forced downwardly thus forcing hydraulic fluid pressure to the respective piston and cylinder arrangement. the outer free edges of the ramp plates 188 engage a bearing plate 190 which provides a sliding support for the outer edge of the inclined pivotal plates 188 thus permitting the transverse plate 186 to move vertically when a vehicle approaches or leaves the plate 186.

With the device in the normal position with the gate closed as shown in Figures 2 and 3, a vehicle approaching the gate will engage the pressure plate 32 and cause fluid pressure to be pumped into the piston and cylinder arrangement 52. As soon as the piston rod 60 moves outwardly, the clutch member 74 will pick up the rod 72 and move it longitudinally for moving the sliding plate 64 from the position illustrated in Figure 2 towards the position illustrated in Figure 4, with the scope of movement being such that the passage of two wheels over the initial pressure plate completely moves the segmental gear 42 to the position shown in Figure 4. This movement of the segmental gear 42 will cause pivotal movement of the arm 44 thus tensioning spring 50 for withdrawing the latch plug 146 for releasing the outer end of the gate at which time the arm 44 having moved to a position shown in Figure 4 has tensioned the spring 50 thus pulling the gate rapidly open. The passing of the front vehicle wheel over the second pressure plate 32 will cause the segmental gear 42 to move a portion of its rotation but will not move the gate until the second vehicle wheel has engaged the pressure plate 32 since it requires the passage of the same number of vehicle wheels to close the gate as passed during the opening thereof. As the gate 12 is released by retracting plug 146, the transverse plate 126 will move downwardly due to action of spring 136 pivoting the straps about pivot pin 139 that is secured to the stationary sleeve 38 thereby bringing the end catches or projections 133 into the normal path of arm 44 which is now holding the gate in open position along with the latch 106. When the arm 44 is swung back to a closed position it will be in advance of the gate due to spring 50 whereby the catches 133 will stop the arm 44 at the desired position and hold the arm 44 until the gate closes at which time roller 124 will release the arm from the notch 132 by lowering plate member 130. Other modes of operating the gate may be used. For instance, one takes a loaded wheelbarrow and runs over the pressure plate 32 that will open the gate 12, pass through the gate and run over the opposite pressure plate 32 and that will close the gate, or if one prefers one can step on the pressure plate 32 and walk through and then step on the opposite pressure plate 32 and it will close. If one should step on the pressure plate 32 twice to open it, then it would require stepping on it twice to close it, for instance, if one was driving a car through towing a trailer, the first wheel of the car on the pressure plate 32 will open the gate 12, the back wheels come along and slide the plate 64 two inches farther, but does not operate anything, now one has two wheels between the two pressure plates 32, the front wheels will now pass over the opposite pressure plate causing plate 64 to slide back two inches and again does not operate anything, then the trailer wheel comes along and slides plate 64 back where it was before the front car wheels passed over the opposite pressure plate, now one has the rear wheels of the car and the trailer wheels between the two pressure plates therefore the opposite pressure plates has to operate twice before it will close the gate.

One could take a string of cars a mile long and if the wheels were spaced from 8 to 14 feet apart the first wheel of the first car would open it and the last wheel of the last car would close it. It adds and subtracts as each wheel passes over until the final wheel has passed over it that subtracts all that has been added and closes the gate.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An automatic farm gate comprising a gate mounted for swinging movement between open and closed positions, fluid motor means resiliently connected with said gate for operating the same, and fluid pump means disposed on opposite approach sides of the gate and connected with the motor means for opening the gate upon actuation of the fluid pump means on one side of the gate and closing the gate upon actuation of the fluid pump means on the opposite side of the gate, said fluid motor means being operated progressively by said fluid pump means, means interconnecting the motor means and gate for disconnecting the gate from the motor means after the gate is moved to an open position whereby the initial actuation of said one fluid pump means will open said gate with all subsequent actuations of the one fluid pump means causing operation of the fluid motor means in one direction and leaving the gate in stationary open position and subsequent actuations of the other fluid pump means causing operation of the motor means in the other direction and effecting connection of the interconnecting means between the gate and motor means just prior to the final actuation of the motor means whereby the final actuation of the opposite fluid pump means causes operation of the fluid motor means in the opposite direction for closing the gate with all preceeding actuations of the opposite fluid pump means causing movement of the fluid motor means in the opposite direction and leaving the gate in stationary open position whereby the first wheel of an approaching vehicle will open the gate and the last wheel thereof will close the gate after the vehicle passes the gate.

2. A farm gate comprising an upright support, a gate pivotally carried by the support for swinging movement about a vertical axis, a horizontally swingable arm underlying said gate, support means for said arm with the support means disposed adjacent the upright support, means interconnecting the free end of the arm and the gate for swinging the gate in response to swinging movement of the arm, said interconnecting means including a resilient element to permit relative movement between the arm and gate while urging the gate towards the arm, a pressure plate located remotely from the gate in the path of approach to the gate, and means interconnecting the pressure plate and arm for swinging the arm and gate in response to depression fo the pressure plate, said last named means including a drive connection rendered inoperative when the gate is moved to an open position, and an anchor provided in spaced relation to the upright support, said anchor being located adjacent the free end of the gate when in closed position and having a keeper thereon, said gate having a slidable latch bar mounted thereon and resiliently urged towards the keeper for engagement therewith for holding the gate in closed position, said latch bar being connected with the outer end of said resilient element and connecting the resilient element to the gate whereby movement of the arm will tension the resilient element, retract the latch bar thereby releasing the gate for movement to an open position and move the gate to an open position.

3. A farm gate comprising an upright support, a gate pivotally carried by the support for swinging movement about a vertical axis, a horizontally swingable arm underlying said gate, support means for said arm with the support means disposed adjacent the upright support, means interconnecting the free end of the arm and the gate for swinging the gate in response to swinging movement of the arm, said interconnecting means including a resilient element to permit relative movement between the arm and gate while urging the gate towards the arm, a pressure plate located remotely from the gate in the path of approach to the gate, and means interconnecting the pressure plate and arm for swinging the arm and gate in response to depression of the pressure plate, said last named means including a drive connection rendered inoperative when the gate is moved to an open position, said upright support being provided with a gravity-operated pivotal latch, said gate having a projecting pin for underlying alignment with the latch when the gate is in open position, and means interconnecting said latch and the interconnecting means between the pressure plate and arm to permit engagement of the latch with the pin when the arm and gate are swung to an open position and the driving connection rendered inoperative and for raising the latch out of engagement with the pin during initial movement of the arm towards a position for urging the gate closed with the resilient element providing for relative movement of the arm in relation to the gate for releasing the latch after which the resilient element urges the gate to closed position in alignment with the arm, and a catch mechanism limiting the movement of the arm towards a gate closing position, said catch mechanism being rendered effective in response to movement of the gate to an open position and rendered ineffective in response to movement of the gate to a closed position.

References Cited in the file of this patent

UNITED STATES PATENTS

| | | |
|---|---|---|
| 211,969 | Carter et al. | Feb. 4, 1879 |
| 1,468,471 | Harsen | Sept. 18, 1923 |
| 1,725,354 | Jasbring | Aug. 20, 1929 |
| 2,166,743 | Miller | July 18, 1939 |
| 2,585,481 | Martin | Feb. 12, 1952 |